US012811691B2

(12) United States Patent
Rekaya et al.

(10) Patent No.: US 12,811,691 B2
(45) Date of Patent: Nov. 24, 2026

(54) IQ DENSE CODING METHOD AND DEVICE FOR SDM COMMUNICATION SYSTEM ON OPTICAL FIBER

(71) Applicant: MIMOPT TECHNOLOGY, Paris (FR)

(72) Inventors: Ghaya Rekaya, Antony (FR); Akram Abouseif, Paris (FR)

(73) Assignee: MIMOPT TECHNOLOGY, Paris (FR)

( * ) Notice: Subject to any disclaimer, the term of this patent is extended or adjusted under 35 U.S.C. 154(b) by 288 days.

(21) Appl. No.: 18/853,377

(22) PCT Filed: Mar. 30, 2023

(86) PCT No.: PCT/FR2023/050463
§ 371 (c)(1),
(2) Date: Apr. 17, 2025

(87) PCT Pub. No.: WO2023/187300
PCT Pub. Date: Oct. 5, 2023

(65) Prior Publication Data

US 2026/0046030 A1 Feb. 12, 2026

(30) Foreign Application Priority Data

Apr. 1, 2022 (FR) ...................................... 2203021

(51) Int. Cl.
*H04B 10/2507* (2013.01)
*H04B 10/2581* (2013.01)
(Continued)

(52) U.S. Cl.
CPC ....... *H04B 10/516* (2013.01); *H04B 10/2507* (2013.01); *H04B 10/2572* (2013.01);
(Continued)

(58) Field of Classification Search
CPC ............ H04B 10/2507; H04B 10/2513; H04B 10/2569; H04B 10/2572; H04B 10/2581;
(Continued)

(56) References Cited

U.S. PATENT DOCUMENTS 10,230,468 B2 * 3/2019 Mansouri Rad ... H04B 10/0795
2014/0270759 A1 * 9/2014 Djordjevic ......... H04B 10/2581 398/44
(Continued)

FOREIGN PATENT DOCUMENTS

FR 3023436 A 1/2016
WO WO-2016145493 A1 * 9/2016 ......... H04B 10/5053

OTHER PUBLICATIONS

El Mehdi Amhoud "Coding techniques for space-division multiplexed optical fiber systems" Networking and Internet Architecture [cs.NI], Télécom ParisTech, 2017. English. NNT : 2017ENST0067. tel-03412785.

(Continued)

*Primary Examiner* — Li Liu

(57) ABSTRACT

The present invention relates to a method and a device for dual-polarisation, fiber-optic SDM transmission. The transmission method uses specific I/Q coding that makes it possible to combat the effects of PDL. The modulation symbols to be transmitted on the 2N polarisation states of the N basic spatial channels are broken down into real and imaginary values (220). A real vector composed by concatenating these real values and imaginary values is then constructed. A first invertible linear transformation, represented by a dense real matrix, is applied (230) to the resulting real vector to provide a transformed real vector. Complex transmission symbols are formed by I/Q combination (240) of the components of the transformed vector,
(Continued)

the transmission symbols then modulating the different polarisation states of the basic spatial channels.

14 Claims, 2 Drawing Sheets

(51) Int. Cl.
*H04B 10/516* (2013.01)
*H04J 14/00* (2006.01)
*H04J 14/04* (2006.01)
*H04J 14/06* (2006.01)

(52) U.S. Cl.
CPC .......... *H04B 10/2581* (2013.01); *H04J 14/04* (2013.01); *H04J 14/05* (2023.08); *H04J 14/052* (2023.08); *H04J 14/06* (2013.01); *H04B 2210/254* (2013.01); *H04J 2203/0089* (2013.01)

(58) Field of Classification Search
CPC H04B 10/50; H04B 10/516; H04B 2210/254; H04J 14/04; H04J 14/05; H04J 14/052; H04J 14/06; H04J 2203/0089
USPC .............. 398/44, 65, 79, 183, 184, 192–194
See application file for complete search history.

(56) References Cited

U.S. PATENT DOCUMENTS

2014/0286648 A1* 9/2014 Buelow ................ G02B 6/2808 398/143
2017/0195052 A1* 7/2017 Awwad .............. H04B 10/2507
2020/0313764 A1* 10/2020 Oveis Gharan ........ H04B 10/66
2025/0096919 A1* 3/2025 Kawai ............... H04J 14/02216

OTHER PUBLICATIONS

Akram Abouseif "Emerging DSP techniques for multi-core fiber transmission systems" Networking and Internet Architecture [cs. NI]. Institut Polytechnique de Paris, 2020. English. NNT : 2020IPPAT013.tel-03101838.
Chen Zhu et al. "Improved polarization dependenent loss tolerance for polarization multiplexed coherent optical systems by polarization pairwise coding", Optics Express, vol. 23, No. 21, Oct. 9, 2015, pp. 27434-27447.
Zhu Chen et al. "Subband Pairwise Coding for robust Nyquist-WDM superchannel Transmission", Journal of lightwave technology, IEEE, USA, vol. 34, No. 8, Apr. 15, 2016, pp. 1746-1753.
International Search Report and Written Opinion dated Jul. 24, 2023 for International Application No. PCT/FR2023/050463.

* cited by examiner

IQ DENSE CODING METHOD AND DEVICE FOR SDM COMMUNICATION SYSTEM ON OPTICAL FIBER

CROSS-REFERENCE TO RELATED APPLICATION

This application is a national stage application, filed under 35 U.S.C. § 371, of International Patent Application No. PCT/FR2023/050463, filed on Mar. 30, 2023, which claims the priority to French application No. FR2203021 filed Apr. 1, 2022, the contents of which are incorporated by reference.

TECHNICAL DOMAIN

The present invention relates to the field of optical fiber communications and more particularly to spatial division multiplexing (SDM) communications.

STATE OF THE PRIOR ART

Advances in attenuation reduction in single-mode optical fibers in recent years have allowed them to almost reach their theoretical transmission capabilities. Spatial multiplexing (SDM) optical communication systems based on multimode and/or multicore optical fibers (or even bundles of single-mode fibers with reduced gain thickness, subsequently referred to as multicore optical fibers) make it possible to overcome this limit by taking advantage of spatial multiplexing between different modes and/or between different cores of an optical fiber.

The use of high modulation orders and multiplexing on orthogonal polarizations have made it possible to further increase the capacity of SDM communication systems, but these advances are now coming up against various limitations.

First, increasing the number of modes/cores leads to an increase in the level of interference between the elementary channels associated with the different modes/cores.

Then, different dispersion phenomena such as mode dispersion or MDL (Mode Dependent Loss), core dispersion or CDL (Core Dependent Loss), polarization dispersion or PMD (Polarization Mode Dispersion) and polarization dependent attenuation or PDL (Polarization Dependent Loss) increase the error rate (BER) in the different channels. However, if the effects due to PMD can be digitally compensated at reception, those due to the PDL as well as those due to the CDL and/or MDL, cannot be so due to their non-unitary nature, which degrades the performance of SDM transmission systems in terms of BER as a function of the flow rate, and therefore of transmission capacity.

In Akram Abouseif's thesis entitled "Emerging DSP techniques for multi-core fiber transmission systems", published in 2020, it was proposed to use space-time coding techniques against the degradation of transmission capacity due to CDL. However, these coding techniques complicate the transmitter and the receiver since the block of information symbols to be transmitted is coded over several successive transmission intervals or TTIs (Time Transmission Intervals) and, more generally, over several channel uses (CUs).

Similarly, it was proposed in the thesis of El Mehdi Amhoud et al. entitled "Coding techniques for spatial multiplexing on optical fiber systems", 2018, to use spatio-temporal coding techniques against the degradation of transmission capacity due to MDL.

An orthogonal polarization precoding method to combat capacity reduction due to PDL was described in the paper by C. Zhu et al. titled "Improved polarization dependent loss tolerance for polarization multiplexed coherent optical systems by polarization pairwise coding" published in Optics Express, vol. 23, no. 21, 9 Oct. 2015, pp. 27434-27447.

This method of precoding on orthogonal polarizations has been schematically illustrated in FIG. 1.

The information symbols (binary words) to be transmitted are converted into symbols of a modulation constellation in the q-ary symbol modulators 110-1 and 110-2. The obtained modulation symbols, $x_1$, $x_2$, are then rotated by angle θ in the complex plane using the respective rotation modules 120-1 and 120-2 to obtain rotated symbols, $x^{\theta}_1$, $x^{\theta}_2$. The real part of the first rotated symbol and the real part of the second rotated symbol are combined at 130-1 to provide a first emission symbol, $x^{\sim}_1=R(x^{\theta}_1)+j.\ R(x^{\theta}_2)$ carried by a first polarization component (e.g. a horizontal polarization state).

Similarly, the imaginary part of the first rotated symbol and the imaginary part of the second rotated symbol are combined at 130-2 to provide a second emission symbol $x^{\sim}_2=I(x^{\theta}_1)+j.\ I(x^{\theta}_2)$ carried by a second polarization component orthogonal to the first one (e.g. a vertical polarization state).

The light signal whose orthogonal polarization components have been respectively modulated by the emission symbols $X_1$, $X_2$ is then transmitted on the optical fiber.

The precoding method described in this paper, however, only applies to a single-mode/single-core optical fiber transmission system and not to an SDM optical communication system.

An object of the present invention is therefore to propose a method of SDM transmission on optical fiber (multimode and/or multicore), as well as an associated device, which makes it possible to achieve high transmission capacities despite interference between elementary spatial channels (interference between different modes and/or different cores), and PDL, while requiring only a single use of transmission channel to transmit a block of information symbols.

PRESENTATION OF THE INVENTION

The present invention is defined by a method of SDM transmission on optical fiber with polarization duality, intended to transmit, during a channel use, 2N symbols belonging to a modulation constellation in the complex plane, N>1 being the number of elementary spatial channels used for the transmission, said SDM transmission method being original in that:

- said symbols undergo a separation into real part and imaginary part to provide a real vector ($X_R$) of size 4N formed by the 2N real parts of these symbols and the 2N imaginary parts of these same symbols;
- an invertible linear transformation represented by a dense real matrix of size 4N×4N is applied to the real vector to provide a transformed real vector;
- 2N complex emission symbols are obtained by performing an IQ combination of 2N components of a first set of components of the transformed real vector respectively with the 2N components of a second set of components of the transformed real vector the first and second sets being disjoint, each complex emission symbol modulating a first state and a second state of polarization of an elementary spatial channel.

Said real vector is typically formed by the concatenation of a first vector composed of the real parts of the modulation symbols and a second vector composed of the imaginary parts of these same symbols.

Preferably, the first set of components of the transformed real vector is composed of the first 2N components of this vector and the second set of components of the transformed real vector is composed of the last 2N components of this vector.

Advantageously, the characteristic polynomial of the dense real matrix does not have real roots. For example, the dense real matrix is a rotation matrix in the $R^{4N}$ space.

According to a first embodiment, the optical fiber is of the multimode type and the elementary spatial channels are propagation modes in the optical fiber.

According to a second embodiment, the optical fiber is of the multi-core type and the elementary spatial channels are different cores of said fiber.

The invention is also defined by a SDM transmission device on optical fiber with polarization duality, intended to transmit, during a channel use, 2N symbols belonging to a modulation constellation in the complex plane, N>1 being the number of elementary spatial channels used for the transmission, said transmission device being original in that it comprises:

- a first module configured to separate each of said symbols into a real part and an imaginary part to provide a real vector ($X_R$) of size 4N formed by the 2N real parts of these symbols and the 2N imaginary parts of these same symbols;
- a second linear combination module configured to apply an invertible linear transformation, represented by a dense real matrix of size 4N×4N, to the real vector to provide a transformed real vector;
- a third IQ combination module configured to respectively combine 2N components of a first set of components of the transformed real vector with 2N components of a second set of components of the transformed real vector, the first and second sets being disjoint, so as to generate 2N complex emission symbols, each complex emission symbol modulating a first state and a second polarization state of an elementary spatial channel.

The first module is typically configured to form said real vector by concatenating a first vector composed of the real parts of the modulation symbols and a second vector composed of the imaginary parts of these same symbols.

Preferably, the third module is configured such that the first set of components of the transformed real vector is composed of the first 2N components of this vector and the second set of components of the transformed real vector is composed of the last 2N components of this vector.

Advantageously, the characteristic polynomial of the dense real matrix does not have real roots.

For example, the dense real matrix is a rotation matrix in the $R^{4N}$ space.

According to a first embodiment, the optical fiber is of the multimode type and the elementary spatial channels are propagation modes in the optical fiber.

According to a second embodiment, the optical fiber is of the multi-core type and the elementary spatial channels are different cores of said fiber.

BRIEF DESCRIPTION OF THE DRAWINGS

Other features and advantages of the invention will appear on reading a preferred embodiment of the invention, described with reference to the attached figures among which.

DESCRIPTION OF THE EMBODIMENTS

Figure 1:
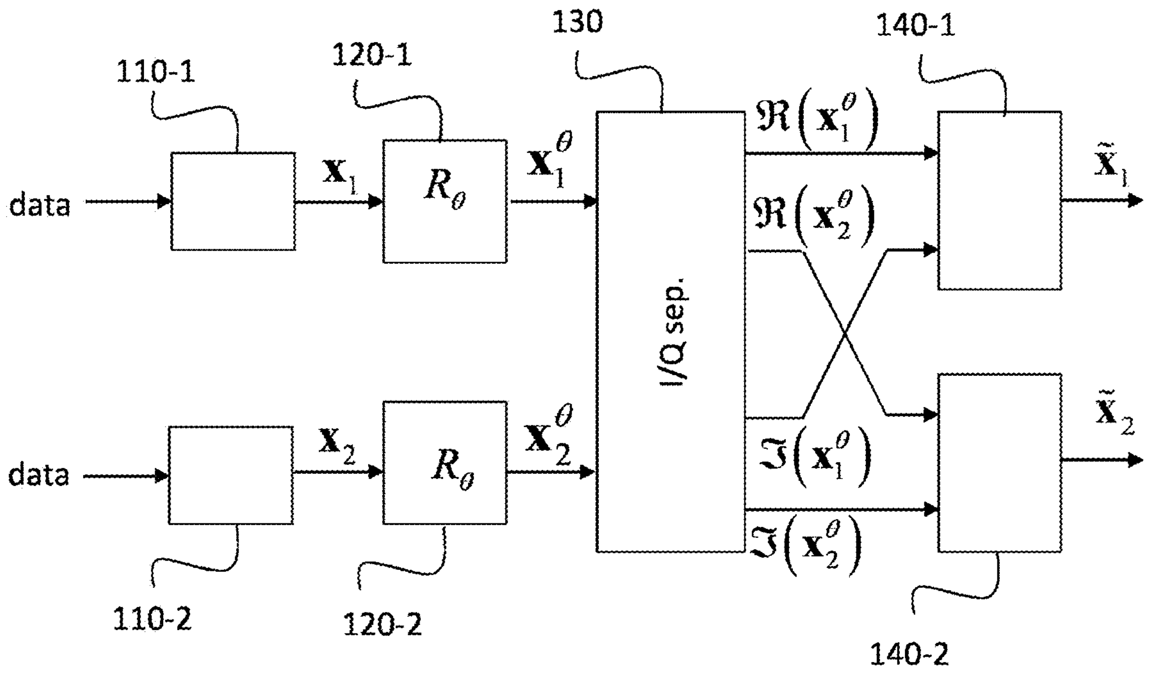
FIG. 1, already described, schematically represents a fiber optic transmission device using pre-coding on two orthogonal polarizations.

We will consider in the following a spatial diversity transmission system (SDM) on optical fiber. Spatial diversity can be due to the plurality of modes and/or cores in the fiber. In the case of a conventional multimode fiber, the core diameter is large enough to allow the propagation of several modes at the considered wavelength. In the case of a multi-core fiber, propagation takes place in a plurality of elementary cores of the fiber. The case of a bundle of single-mode fibers with reduced cladding thickness is subsequently assimilated to a multi-core fiber.

The SDM transmission systems considered below can be of one and/or the other type, it being understood that the elementary spatial channels are then propagation modes and/or cores of an optical fiber.

We will further assume that the optical fiber is classically affected by PDL attenuation, that is, that the different states of polarization (SOP) in the fiber do not undergo the same attenuation. It is recalled that PDL attenuation is generally introduced by optical elements between fiber sections, in particular doped fiber optical amplifiers (EDFA) which create energy losses and fluctuations in the optical signal to noise ratio (OSNR). Polarization dispersion (PMD) will be ignored, however, as this effect can be effectively corrected by channel equalization in the receiver's DSP.

An SDM channel model was described in the article by A. Abouseif et al. entitled "Channel model and optimal core scrambling for multi-core fiber transmission system", Optics communications, Volume 454, 2020. The elementary spatial channels correspond to the different cores of a multi-core fiber (MCF) and/or to the different modes of a multi-mode fiber (MMF).

The effect of PDL attenuation for an elementary spatial channel can be expressed by the matrix $H_{PDL}$ applying to both polarization states:

$$H_{PDL} = D_\gamma R_\varphi B_\beta \qquad \text{[Math. 1]}$$

Where $$D_\gamma = \begin{pmatrix} \sqrt{1+\gamma} & 0 \\ 0 & \sqrt{1-\gamma} \end{pmatrix}$$

is the gain matrix, $$R_\varphi = \begin{pmatrix} \cos\varphi & -\sin\varphi \\ \sin\varphi & \cos\varphi \end{pmatrix}$$

is the polarization rotation matrix and $$B_\beta = \begin{pmatrix} e^{i\beta} & 0 \\ 0 & e^{i\beta} \end{pmatrix}$$

is the birefringence matrix with $\gamma\in[0,1]$ defining the PDL value, $\Gamma_{dB}=10\log_{10}(\Gamma)$ with $\Gamma=(1+\gamma)/(1-\gamma)$ and $\varphi, \beta\in[-\pi, \pi]$. The SDM transmission system uses a plurality N of elementary spatial channels, each elementary spatial channel being associated with two polarization states. Thus, at each transmission instant, in other words at each use of the channel, the transmission system can transmit 2N modulation symbols, one symbol being transmitted per polarization state and per elementary spatial channel. The number N is generally chosen to be high, of the order of several tens or more. In any case N>1.

The idea behind the present invention is to separate the real parts and the imaginary parts of the different modulation symbols and to subject all the real and imaginary parts of the different symbols to an invertible linear transformation. This results in an averaging of the PDL attenuation and the CDL and/or MDL attenuation over the different polarization states and the different elementary spatial channels.

Figure 2:
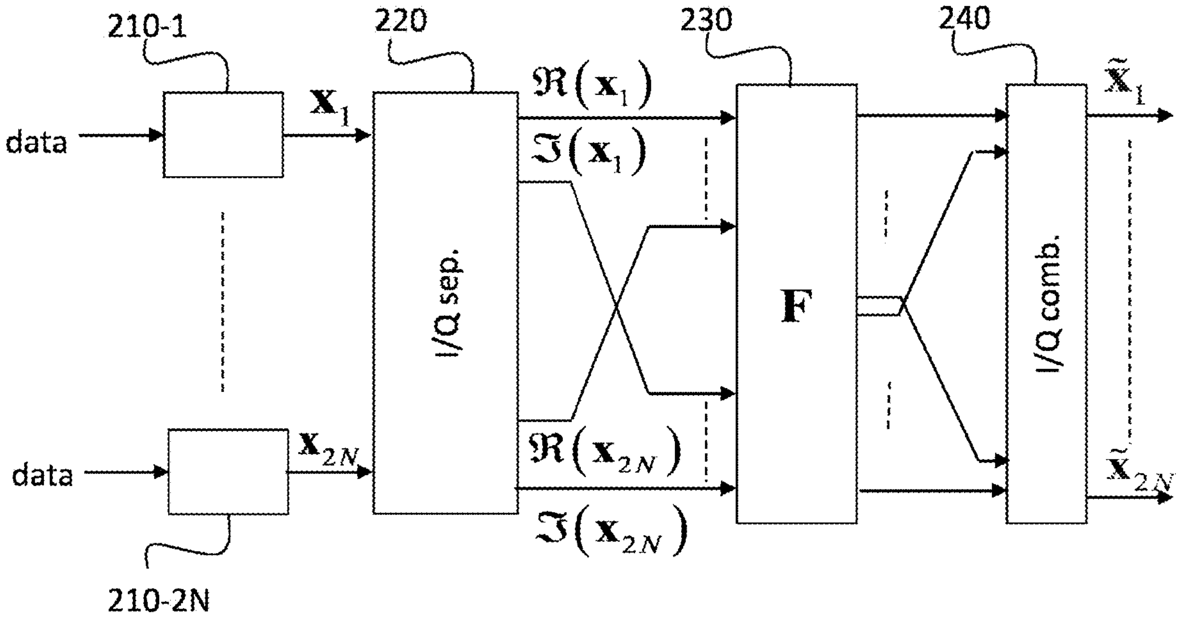
FIG. 2 schematically represents an SDM transmission device on optical fiber with dense IQ coding according to a general embodiment of the invention.

FIG. 2 schematically represents an SDM transmission device on optical fiber according to a general embodiment of the invention.

The data to be transmitted at each transmission interval is in the form of 2N information symbols, for example 2N q-ary words with $q\leq\log_2 Q$ where Q is the cardinality of the modulation alphabet. The modulation alphabet can notably be a Q-QAM alphabet.

The information symbols themselves may result from source coding and/or channel coding, in a manner known per se.

In all cases, the 2N information symbols are respectively converted into 2N modulation symbols in the q-ary modulators with symbol 210-1, . . . , 210-2N. The odd indices of these symbols correspond to a first polarization state and the even indices to a second polarization state, orthogonal to the first one. Each of these modulation symbols, noted in the sequence $x_1, \ldots, x_{2N}$, is then subjected to a decomposition into a real part and an imaginary part in the separation module I/Q, 220.

The real parts $R(x_1), \ldots, R(x_{2N})$ and the imaginary parts $I(x_1), \ldots, I(x_{2N})$ form a real vector $X_R$ of $R^{4N}$ which is supplied to the linear combination module 230.

In the figure, the real vector $X_R$ is obtained by separately grouping the real parts and the real parts of the modulation symbols $x_1, \ldots, x_{2N}$, i.e. $X_R=(R(x_1) \ldots R(x_{2N})\ I(x_1) \ldots I(x_{2N}))^T$. However, in general the vector $X_R$ can be obtained by concatenating in any way the real parts and the imaginary parts of these symbols, i.e.

$X_R=\sigma(R(x_1) \ldots R(x_{2N}) I(x_1) \ldots I(x_{2N}))^T$ where $\sigma$ represents any permutation of the 2N components.

The first module 230 combines the elements of $X_R$ by means of an invertible linear transformation, F, represented by a matrix $F\in GL(4N, R)$, a linear group of dimension 4N on R, to provide a transformed vector, $\tilde{X}_R$, in $R^{4N}$. The linear transformation is chosen such that the matrix F (representative of F in the canonical basis of $R^{4N}$ is dense (or full), that is to say that it does not contain any zero. Advantageously, the matrix F is chosen such that its characteristic polynomial has no root in R, in other words such that it has no eigen space. This property ensures efficient mixing of the components of the $X_R$ vector and consequently averaging of the PDL.

The transformed vector, $\tilde{X}_R$, can be expressed in the following form:

$$\tilde{X}_R = FX_R = \begin{pmatrix} f_1\left(R(x_i)_{i=1,\ldots,4N}, I(x_i)_{i=1,\ldots,4N}\right) \\ \vdots \\ \vdots \\ f_{4N}\left(R(x_i)_{i=1,\ldots,4N}, I(x_i)_{i=1,\ldots,4N}\right) \end{pmatrix} \quad \text{[Math. 2]}$$

where $f_1, f_2, \ldots, f_{4N}$ are linear forms on $R^{4N}$.

The first 2N elements and the last 2N elements of $\tilde{X}_R$ are then combined two by two in an I/Q combination module, 240, to give a complex vector $\tilde{X}_C$, of dimension 2N:

[Math. 3]

$$\tilde{X}_C = \begin{pmatrix} f_1\left(R(x_i)_{i=1,\ldots,4N}, I(x_i)_{i=1,\ldots,4N}\right) + jf_{2N+1}\left(R(x_i)_{i=1,\ldots,4N}, I(x_i)_{i=1,\ldots,4N}\right) \\ \vdots \\ \vdots \\ f_{2N}\left(R(x_i)_{i=1,\ldots,4N}, I(x_i)_{i=1,\ldots,4N}\right) + jf_{4N}\left(R(x_i)_{i=1,\ldots,4N}, I(x_i)_{i=1,\ldots,4N}\right) \end{pmatrix}$$

More generally, we can form a first partial transformed vector $\tilde{X}^1_R$, of size 2N by selecting 2N components of the vector $\tilde{X}_R$ and a second partial transformed vector, $\tilde{X}^2_R$, also of size 2N, by selecting the remaining 2N components, the complex vector then being obtained as $\tilde{X}_C=\tilde{X}^1_R+j\tilde{X}^2_R$.

In any case, the complex elements $\tilde{x}_1, \ldots, \tilde{x}_{2N}$ of the vector $\tilde{X}_C$ are respectively used to modulate the 2N polarization states of the N elementary SDM channels.

Figure 3:
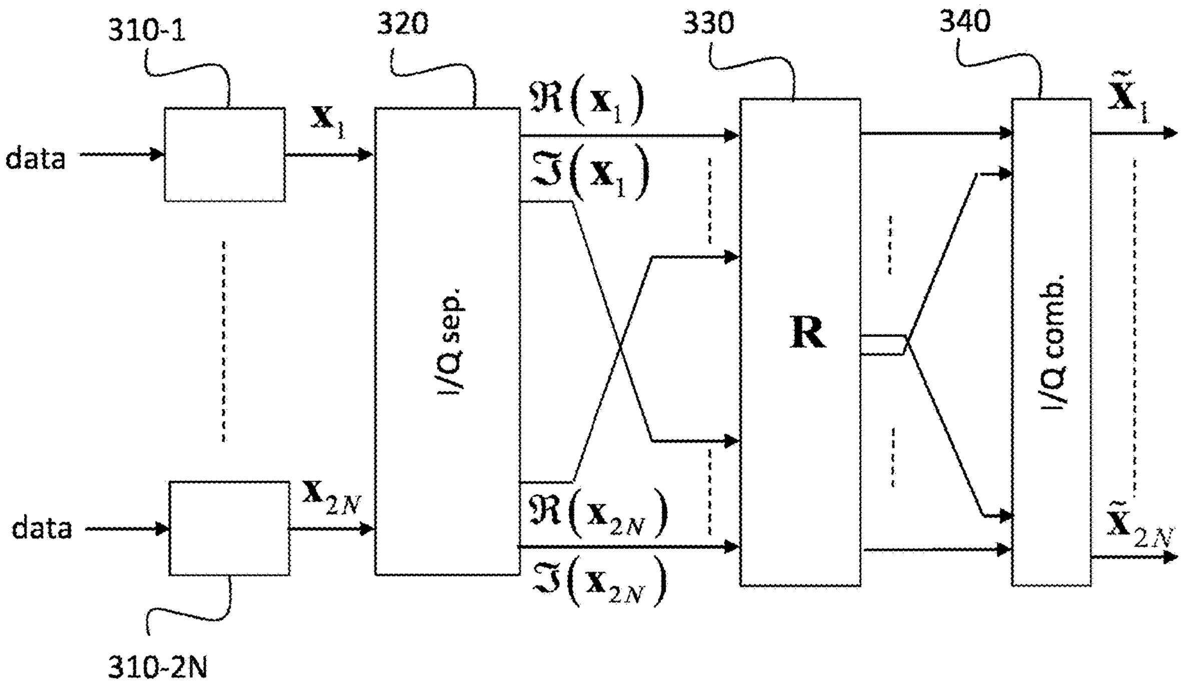
FIG. 3 schematically represents an SDM transmission device on optical fiber with dense IQ coding according to a preferred embodiment of the invention.

FIG. 3 schematically represents a WDM transmission device on optical fiber according to a preferred embodiment of the invention.

Modules 310-1, . . . , 310-N, 320, 330, 340 respectively perform the same functions as modules 210-1, 210-N, 220, 230, 240 of FIG. 2.

This embodiment is a special case of that shown in FIG. 2 in that the linear transformation here is a rotation in the $R^{4N}$ space.

Note that the fact that the matrix must be full immediately excludes trivial rotation matrices $I_{4N}$ or $-I_{4N}$ where $I_{4N}$ is the identity matrix of size 4N.

Furthermore, since the dimension of space is even, the rotation matrix does not have an eigen (invariant) space.

Again, the vector $X_R$ can be obtained by concatenating in any way the real parts and the imaginary parts of the modulation symbols $x_1, \ldots, x_{2N}$. Similarly, the complex vector $\tilde{X}_C$ can be obtained as $\tilde{X}_C=\tilde{X}^1_R+j\tilde{X}^2_R$ from partial transformed vectors $\tilde{X}^1_R$, $\tilde{X}^2_R$ constructed by selecting for each a set of 2N components of the transformed vector, the sets of components associated with these two vectors being disjoint.

Finally, the complex éléments $\tilde{x}_1, \ldots, \tilde{X}_{2N}$ of the vector $\tilde{X}_C$ are respectively used to modulate the 2N polarization states of the N elementary SDM channels.

In the embodiments presented in FIGS. 2 and 3, the dense IQ coding is applied to all the SDM elementary channels. However, alternatively, the dense IQ coding may be applied by blocks of spatial channels (mode block and/or core block), the invertible linear transformations, for example the rotations, being able to be chosen distinct from one block of spatial channels to another.

Finally, although the present invention has been presented in the context of a dual polarization state optical fiber, those skilled in the art will understand that the dense IQ coding method described above can be applied in the case of a single polarization state.

In all cases, the received optical signal is demultiplexed both spatially (by propagation mode and/or by core) and by polarization. According to a first variant, a channel estimation and a corresponding equalization can be carried out elementary spatial channel by elementary spatial channel. According to a second variant, the channel estimation and the corresponding equalization can be carried out globally on all the elementary spatial channels, i.e. a 2N×2N MIMO channel. In both cases, the channel estimation can be based on pilot symbols. For this purpose, we can use CAZAC (Constant Amplitude Zero Auto Correlation) sequences, for example Zadoff-Chu sequences.

In the case of a 2N×2N MIMO channel equalization, the symbols transmitted by the transmission device can be estimated using a MIMO decoder using an ML (Maximum Likelihood) estimate or more simply a ZF (Zero Forcing) estimate aimed at multiplying the received signal by the pseudo-inverse of the channel matrix, namely $\hat{\hat{X}}_C=(H^H H)^{-1}H^H Y$ where $\hat{H}$ of size 2N×2N is the estimated matrix of the MIMO channel. Alternatively, in an elementary spatial channel by elementary spatial channel equalization, the estimation of the symbols transmitted is carried out from N matrices $\hat{H}_i$, i=1, . . . , N, each of these matrices corresponding to an elementary spatial channel. It should be noted that this operation does not include the inversion of the linear transformation represented by the matrix F.

After separating the real and imaginary parts of each of the components of $\hat{\hat{X}}_C$, we construct from these components a real vector, $\hat{\hat{X}}$R, of size 4N. For example, if the embodiment illustrated in FIG. 2 or FIG. 3 was used in the broadcast, a first vector consisting of the 2N real parts and a second vector consisting of the 2N imaginary parts could be formed, then the first vector and the second vector could be concatenated to obtain the real vector $\hat{\hat{X}}$R.

We then apply the inverse orthogonal transformation $F^{-1}$ to the vector $\hat{\hat{X}}$R to obtain a vector $\hat{X}_R$, then the inverse of the permutation σ applied to the emission on its components.

For example, when the real vector has been obtained by grouping the real parts and the imaginary parts of the modulation symbols, the first 2N components of the vector $\hat{X}_R$ give an estimate of the real parts $R(\hat{x}_1), \ldots, R(\hat{x}_{2N})$ and the last 2N components give an estimate of the imaginary parts $I(\hat{x}_1), \ldots, I(\hat{x}_{2N})$ of the transmitted modulation symbols.

The invention claimed is:

1. SDM transmission method on dual polarization optical fiber, intended to transmit, during channel use, 2N symbols belonging to a modulation constellation in the complex plane, N>1 being the number of elementary spatial channels used for transmission, wherein:

- said symbols undergo a separation into real part and imaginary part to provide a real vector of size 4N formed by the 2N real parts of these symbols and the 2N imaginary parts of these same symbols;
- an invertible linear transformation represented by a dense real matrix of size 4N×4N is applied to the real vector to provide a transformed real vector;
- 2N complex emission symbols are obtained by performing an IQ combination of 2N components of a first set of components of the transformed real vector respectively with the 2N components of a second set of components of the transformed real vector, the first and second sets being disjoint, each complex emission symbol modulating a first state and a second state of polarization of an elementary spatial channel.

2. SDM transmission method on dual polarization optical fiber according to claim 1, characterized in that said real vector is formed by the concatenation of a first vector composed of the real parts of the modulation symbols and of a second vector composed of the imaginary parts of these same symbols.

3. SDM transmission method on dual polarization optical fiber according to claim 1, characterized in that the first set of components of the transformed real vector is composed of the first 2N components of this vector and that the second set of components of the transformed real vector is composed of the last 2N components of this vector.

4. SDM transmission method on polarization dual optical fiber according to claim 1, characterized in that the characteristic polynomial of the dense real matrix does not have real roots.

5. SDM transmission method on dual polarization optical fiber according to claim 4, characterized in that the dense real matrix is a rotation matrix in the $R^{4N}$ space.

6. SDM transmission method on dual polarization optical fiber according to claim 1, characterized in that the elementary spatial channels are propagation modes in the optical fiber.

7. SDM transmission method on dual polarization optical fiber according to claim 1, characterized in that the optical fiber is of the multicore type and that the elementary spatial channels are different cores of said fiber.

8. SDM transmission device on optical fiber with polarization duality, intended to transmit, during a channel use, 2N symbols belonging to a modulation constellation in the complex plane, N>1 being the number of elementary spatial channels used for the transmission, wherein it comprises:

- a first module configured to separate each of said symbols into a real part and an imaginary part to provide a real vector of size 4N formed by the 2N real parts of these symbols and the 2N imaginary parts of these same symbols;
- a second linear combination module configured to apply an invertible linear transformation, represented by a dense real matrix of size 4N×4N, to the real vector to provide a transformed real vector;
- a third IQ combining module configured to respectively combine 2N components of a first set of components of the transformed real vector with 2N components of a second set of components of the transformed real vector, the first and second sets being disjoint, so as to generate 2N complex emission symbols, each complex emission symbol modulating a first polarization state and a second polarization state of an elementary spatial channel.

9. SDM transmission device on optical fiber with polarization duality according to claim 8, characterized in that the first module is configured to form said real vector by concatenating a first vector composed of the real parts of the modulation symbols and a second vector composed of the imaginary parts of these same symbols.

10. SDM transmission device on optical fiber with polarization duality according to claim 8, characterized in that the third module is configured so that the first set of components of the transformed real vector is composed of the first 2N components of this vector and that the second set of components of the transformed real vector is composed of the last 2N components of this vector.

11. SDM transmission device on optical fiber with polarization duality according to claim 8, characterized in that the characteristic polynomial of the dense real matrix does not have real roots.

12. SDM transmission device on optical fiber with polarization duality according to claim 11, characterized in that the dense real matrix is a rotation matrix in the $R^{4N}$ space.

13. SDM transmission device on optical fiber with polarization duality according to claim 8, characterized in that the elementary spatial channels are propagation modes in the optical fiber.

14. SDM transmission device on optical fiber with polarization duality according to claim 8, characterized in that the optical fiber is of the multicore type and that the elementary spatial channels are different cores of said fiber.

* * * * *